United States Patent
Homma (10) Patent No.: US 11,388,342 B2
(45) Date of Patent: Jul. 12, 2022

(54) OPERATION APPARATUS, LENS APPARATUS, AND IMAGE PICKUP APPARATUS

(71) Applicant: CANON KABUSHIKI KAISHA, Tokyo (JP)

(72) Inventor: Taiki Homma, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 302 days.

(21) Appl. No.: 16/693,533

(22) Filed: Nov. 25, 2019

(65) Prior Publication Data
US 2020/0169667 A1 May 28, 2020

(30) Foreign Application Priority Data
Nov. 28, 2018 (JP) .............................. JP2018-222461

(51) Int. Cl.
*H04N 5/232* (2006.01)
*G02B 7/04* (2021.01)

(52) U.S. Cl.
CPC ........... *H04N 5/23296* (2013.01); *G02B 7/04* (2013.01); *H04N 5/23241* (2013.01)

(58) Field of Classification Search
CPC .. H04N 5/23296; H04N 5/23241; G02B 7/04; G02B 7/008; G02B 7/102; G03B 2205/0046; G03B 2205/0053; G03B 5/00
See application file for complete search history.

(56) References Cited

U.S. PATENT DOCUMENTS

| 5,200,860 | A | * | 4/1993 | Hirasawa | G02B 7/102 359/696 |
| 5,436,684 | A | * | 7/1995 | Hirasawa | G02B 7/04 348/347 |
| 5,638,217 | A | * | 6/1997 | Hirasawa | G02B 7/102 359/698 |
| 6,169,578 | B1 | * | 1/2001 | Chigira | G02B 7/102 348/347 |
| 6,788,888 | B1 | * | 9/2004 | Idemura | H04N 5/232 396/85 |
| 7,079,182 | B1 | * | 7/2006 | Yoshikawa | G02B 7/102 348/211.6 |
| 7,158,179 | B2 | * | 1/2007 | Yoshikawa | G02B 7/102 348/240.99 |
| 2008/0310039 | A1 | * | 12/2008 | Tanaka | H04N 5/23206 359/823 |

(Continued)

FOREIGN PATENT DOCUMENTS

JP 3450793 B2 9/2003

*Primary Examiner* — Chiawei Chen
(74) *Attorney, Agent, or Firm* — Rossi, Kimms & McDowell LLP (57) ABSTRACT

Provided is an operation apparatus for operating driving of an optical member, the operation apparatus including: a storage configured to store a speed of the optical member in advance; an operation member; and a processor configured to generate a command corresponding to the stored speed based on an operation of the operation member, wherein the processor is configured to perform processing of changing the generated command to another command based on a state of the optical member of which driving is operated based on the generated command.

13 Claims, 9 Drawing Sheets

(56) References Cited

U.S. PATENT DOCUMENTS

| | | | |
|---|---|---|---|
| 2012/0249809 A1* | 10/2012 | Yonezawa | H04N 13/239 |
| | | | 348/207.1 |
| 2013/0088632 A1* | 4/2013 | Korekuni | G03B 31/00 |
| | | | 348/335 |
| 2013/0286278 A1* | 10/2013 | Asano | H04N 5/232123 |
| | | | 348/360 |
| 2016/0299314 A1* | 10/2016 | Makita | H04N 5/23296 |

* cited by examiner

OPERATION APPARATUS, LENS APPARATUS, AND IMAGE PICKUP APPARATUS

BACKGROUND OF THE INVENTION

Field of the Invention

The present invention relates to an operation apparatus, a lens apparatus, and an image pickup apparatus.

Description of the Related Art

Many lens apparatus (optical apparatus), such as a television lens apparatus and a video lens apparatus, include movable optical members, such as a zoom lens unit, a focus lens unit, and an iris, and are capable of controlling driving speeds of the optical members. For example, a zoom lens unit can be operated (moved) at a variable speed depending on a demand of an operator with the use of an operation apparatus, which is also called as a "zoom demand".

Incidentally, various imaging methods are adopted to take an image with the use of the lens apparatus. One of the methods is zooming at a constant speed. Such constant-speed zooming can be repeated a number of times. Therefore, there is known a lens apparatus having a function (hereinafter also referred to as a "speed preset function") of driving a zoom lens unit in a previously-stored driving direction at a previously-stored driving speed.

In Japanese Patent No. 3,450,793, there is disclosed an optical apparatus configured to allow an operator to finely adjust a driving speed while the speed preset function is performed, in order to improve operability of the speed preset function.

The movable optical members, such as a zoom lens, in the optical apparatus have different minimum speeds at which the optical members can start moving smoothly depending on weights of the optical members, and postures (inclinations), temperatures, and characteristics (such as servo performance) of the optical apparatus. Therefore, for example, when a very low speed is stored in the speed preset function, the optical member may not be able to start moving at the stored speed depending on a type and a state of the optical apparatus.

With the optical apparatus disclosed in Japanese Patent No. 3,450,793, an operation of increasing a set speed may be performed when the optical member does not start moving, but the operation becomes complicated.

Further, when such a very low speed cannot be preset in order to make sure that the lens starts moving, unnecessary limitation may be placed on an optical apparatus in which an optical member can start moving even at the very low speed.

SUMMARY OF THE INVENTION

An aspect of embodiments provides, for example, an operation apparatus beneficial in operability thereof.

In order to achieve the above-mentioned object, according to at least one embodiment of the present invention, there is provided an operation apparatus for operating driving of an optical member, the operation apparatus including: a storage configured to store a speed of the optical member in advance; an operation member; and a processor configured to generate a command corresponding to the stored speed based on an operation of the operation member, wherein the processor is configured to perform processing of changing the generated command based on a state of the optical member of which driving is operated based on the generated command.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

First Embodiment

A first embodiment of the present invention is described with reference to FIG. 1 to FIG. 4B.

Figure 1:
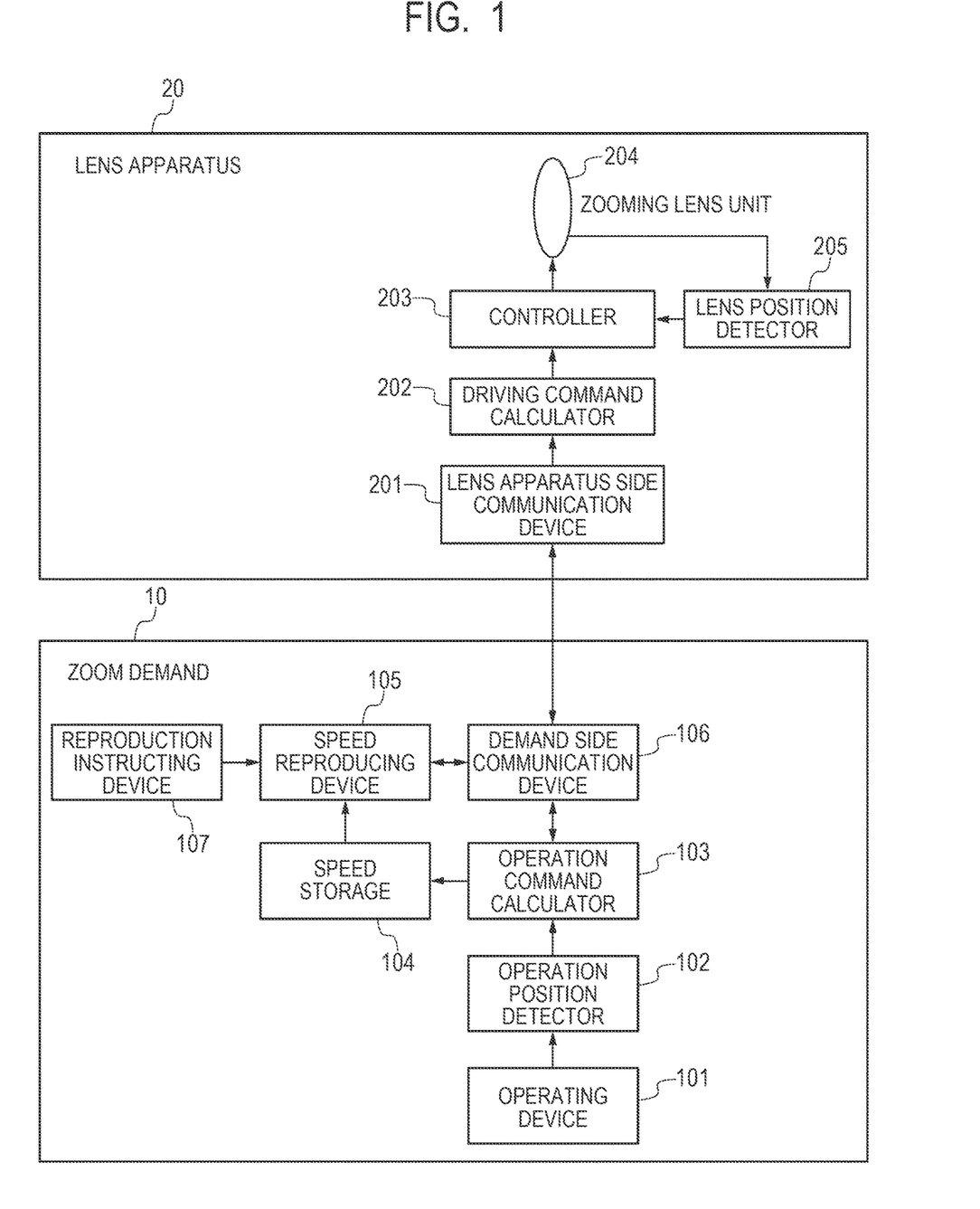
FIG. 1 is a block diagram of a lens apparatus and an operation apparatus according to a first embodiment of the present invention.

FIG. 1 is a block diagram of a lens apparatus and an operation apparatus according to the first embodiment.

A zoom demand 10, which is an operation apparatus, is an operation apparatus to be used to operate a lens apparatus 20. The zoom demand 10 and the lens apparatus 20 form a lens system.

An operating device 101 is an operation member to be used by a photographer to operate a zoom lens, and a thumb ring is used, for example.

An operation position detector 102 is a position sensor, for example, a potentiometer or a rotary encoder, and is configured to output a position signal corresponding to an operation position (operation amount) of the operating device 101.

An operation command calculator 103 is configured to derive a zoom operation command value based on an input from the operation position detector 102. The derivation of the zoom operation command value by the operation command calculator 103 may be calculation based on the input from the operation position detector 102, or reading from a table based on the input from the operation position detector 102. The zoom operation command value hereinafter indicates a driving direction and a driving speed, but may indicate a driving amount or a driving position.

A speed storage 104 is configured to store the zoom operation command value (operation speed at which the operation is performed at present), which is calculated by the operation command calculator 103, in response to a predetermined storage operation. The storage operation may be an operation via a switch, or detection of a particular move of the operating device 101, and the present invention is not particularly limited thereto. Further, as the value to be stored in this example, the zoom operation command value may be directly and numerically specified, a zoom operation command value that has been stored in the past may be specified again, or a stored zoom operation command value may be finely adjusted.

A speed reproducing device (processor) 105 is configured to calculate (derive) a zoom operation command value (speed reproducing value) based on the zoom operation command value stored in the speed storage 104 (command corresponding to the stored operation speed), and information received by a demand side communication device 106 in response to a predetermined reproducing operation. In this example, the speed reproducing device 105 is configured to calculate the zoom operation command value when a command from a reproduction instructing device 107 is input to the speed reproducing device 105. The reproducing operation may be an operation via a switch, or detection of a particular move of the operating device 101, and is not limited to the command from the reproduction instructing device 107.

The demand side communication device 106 is configured to encode the zoom operation command value calculated by the operation command calculator 103 or the speed reproducing device 105 into a communication command form for transmission to a lens apparatus side communication device 201 of the lens apparatus 20. The demand side communication device 106 is also configured to receive position information of a zoom lens 204 (also referred to as a zoom lens unit) from the lens apparatus side communication device 201 of the lens apparatus 20. The demand side communication device 106 may further receive model information (identification information) of the lens apparatus 20, driving torque information of the zoom lens 204, servo performance information (driving characteristic), temperature information, and posture information for driving the zoom lens 204, information on a minimum speed at which the zoom lens 204 can be driven, and the position information and control characteristics of the zoom lens 204, for example.

The lens apparatus side communication device 201 is included in the lens apparatus 20, and is configured to transmit and receive a command to and from the demand side communication device 106 of the zoom demand 10. When receiving a command of the zoom operation command value, the lens apparatus side communication device 201 decodes the received data, and sends the decoded data to a driving command calculator 202.

The driving command calculator 202 is configured to generate a driving signal (zoom driving command value) for controlling driving (speed) of the zoom lens 204 based on the zoom operation command value, and send the generated driving signal to a controller 203.

The controller 203 is configured to control driving of the zoom lens 204 based on the driving signal input from the driving command calculator 202.

The zoom lens 204 is an optical element that is movable to adjust an angle of view.

A lens position detector 205 is a position sensor configured to detect a position of the zoom lens 204, and a detected position signal is input to the driving command calculator 202. The driving command calculator 202 and the lens position detector 205 perform feedback control on the zoom lens 204.

In the illustrated example, the lens apparatus and the operation apparatus are independent from each other, and are connected to each other via the communication devices. However, the present invention is not limited thereto, and may adopt a configuration in which the lens apparatus and the operation apparatus are integrated with each other, for example.

Figure 2:
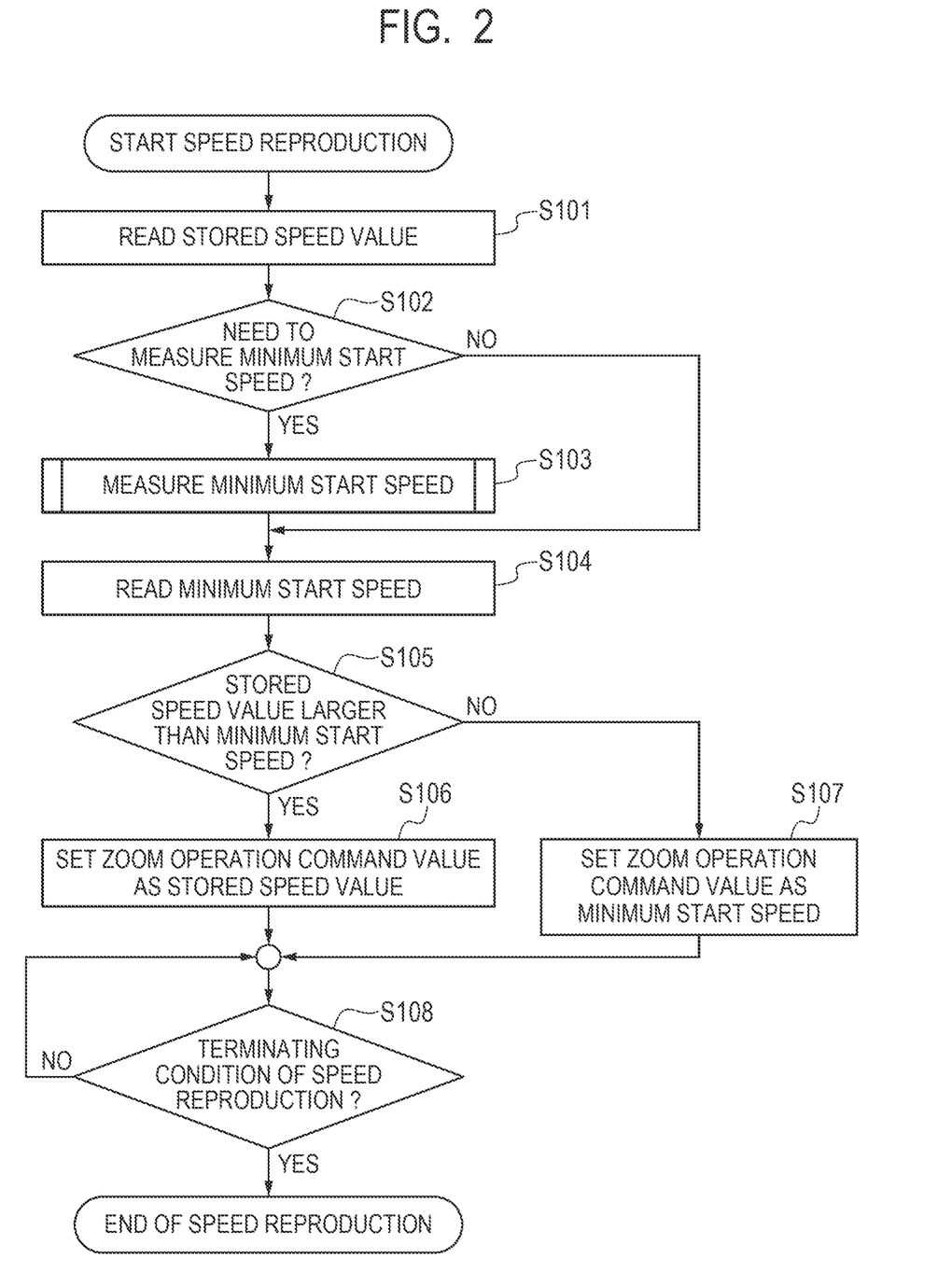
FIG. 2 is a flow chart of speed reproduction processing in the first embodiment.

FIG. 2 is a flow chart of speed reproduction to be performed by the speed reproducing device 105 in the first embodiment.

In Step S101, the zoom operation command value (stored speed value) stored in the speed storage 104 is read, and the processing proceeds to Step S102.

In Step S102, it is determined whether there is a need to detect a speed (hereinafter referred to as a "minimum start speed") required for the lens to start moving, and the processing proceeds to Step S103 when there is a need to detect the minimum start speed, and to Step S104 when there is no need to detect the minimum start speed. As cases in which there is a need to detect a minimum start speed, the time of power-on and the time when the zoom operation command value stored in the speed storage 104 is updated can be thought of, for example, but a minimum start speed may be detected every time irrespective of the conditions. Further, a minimum start speed may be detected for each driving direction, for each lens, or for each position (preset range of positions) of the lens.

In Step S103, a minimum start speed is detected based on the position information of the zoom lens 204 obtained by the demand side communication device 106, and the processing proceeds to Step S104.

In Step S104, the minimum start speed measured in Step S103 is read, and the processing proceeds to Step S105.

In Step S105, the stored speed value read in Step S101 and the minimum start speed read in Step S104 are compared with each other. As a result of the comparison, when the stored speed value is larger than the minimum start speed, the processing proceeds to Step S106, and when the stored speed value is equal to or smaller than the minimum start speed, the processing proceeds to Step S107.

In Step S106, the zoom operation command value is set as the stored speed value read in Step S101, and the processing proceeds to Step S108.

In Step S107, the zoom operation command value is set as the minimum start speed read in Step S104, and the processing proceeds to Step S108.

In Step S108, when a terminating condition of the speed reproduction is satisfied, the speed reproduction is ended, and when the terminating condition is not satisfied, the speed reproduction is continued (the determination in Step S108 is repeated until the terminating condition is satisfied). As the terminating condition of the speed reproduction, various conditions, such as a case in which the operating device 101 is operated, a case in which a speed reproducing operation is executed again, and a case in which the zoom lens 204 reaches a preset target position, can be thought of, but the present invention is not particularly limited thereto.

Figure 3:
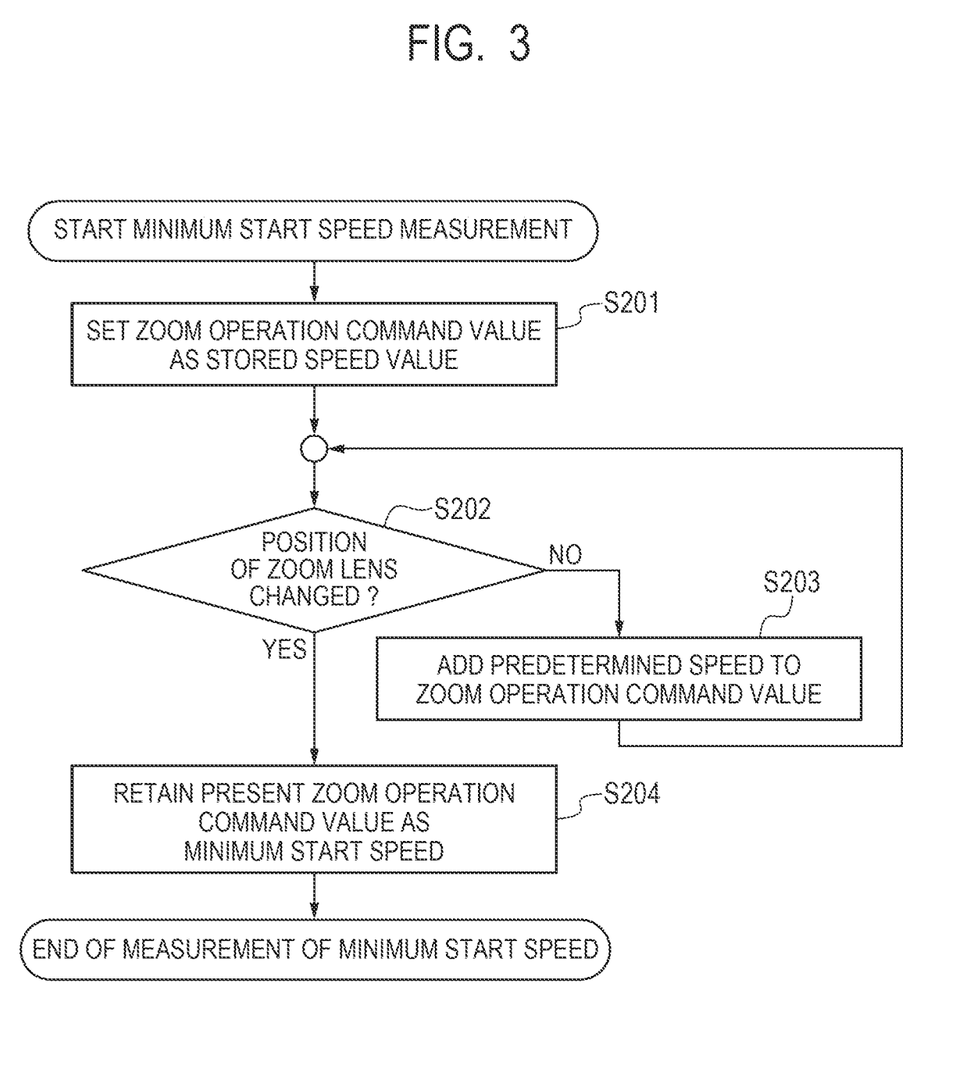
FIG. 3 is a flow chart of minimum start speed detection processing in the first embodiment.

FIG. 3 is a flow chart for illustrating the processing of detecting a minimum start speed, which is performed by the speed reproducing device 105 in Step S103 of FIG. 2.

In Step S201, the zoom operation command value is set as the stored speed value read in Step S101, and the processing proceeds to Step S202. The set zoom operation command value is output to the lens apparatus 20 via the demand side communication device 106, and the lens apparatus 20 controls driving of the zoom lens 204 based on the input zoom operation command value.

In Step S202, it is determined whether the position of the zoom lens 204, which has been received by the demand side communication device 106, has changed (the zoom lens 204 has started moving). When the position has not changed, the processing proceeds to Step S203, and when the position has changed, the processing proceeds to Step S204. The determination may be performed at all times, or may be performed every predetermined period of time. Alternatively, time until the first determination and time until the subsequent determination may be set to be different from each other.

In Step S203, a predetermined speed is added to the zoom operation command value to increase the zoom operation command value, and the processing proceeds to Step S202. The speed to be added at this time may be a constant value, or may be varied depending on a speed indicated by the zoom operation command value.

In Step S204, a speed at which the position of the zoom lens 204 has changed is retained as a minimum start speed, and the minimum start speed measurement processing is ended. The minimum start speed to be retained here may be the only value irrespective of conditions, may be retained for each connected lens, or may be retained for each driving direction, or for each position (preset range of positions) of the lens.

When information (for example, model information, temperature information, and posture information of the lens, and information on a minimum speed at which the lens can be driven) other than the position information of the zoom lens 204 is received by the demand side communication device 106, a minimum start speed may be detected or calculated with the use of the information.

Figure 4A:
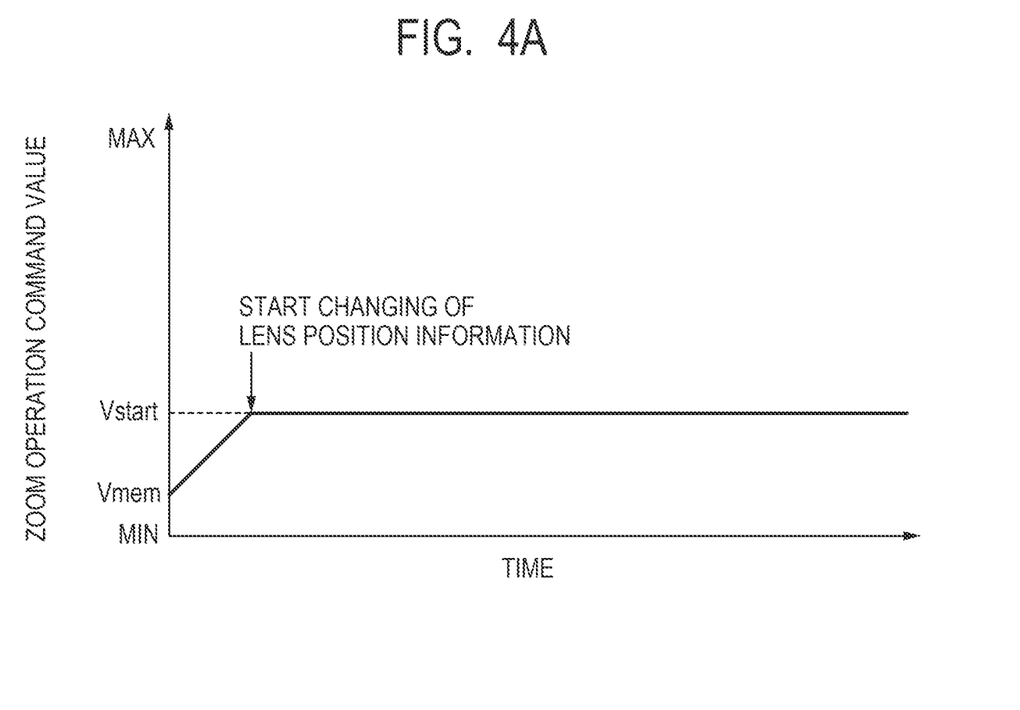
FIG. 4A is a graph of movement of a zoom operation command value (in a case where there is a need to detect a minimum start speed) during speed reproduction in the first embodiment.
Figure 4B:
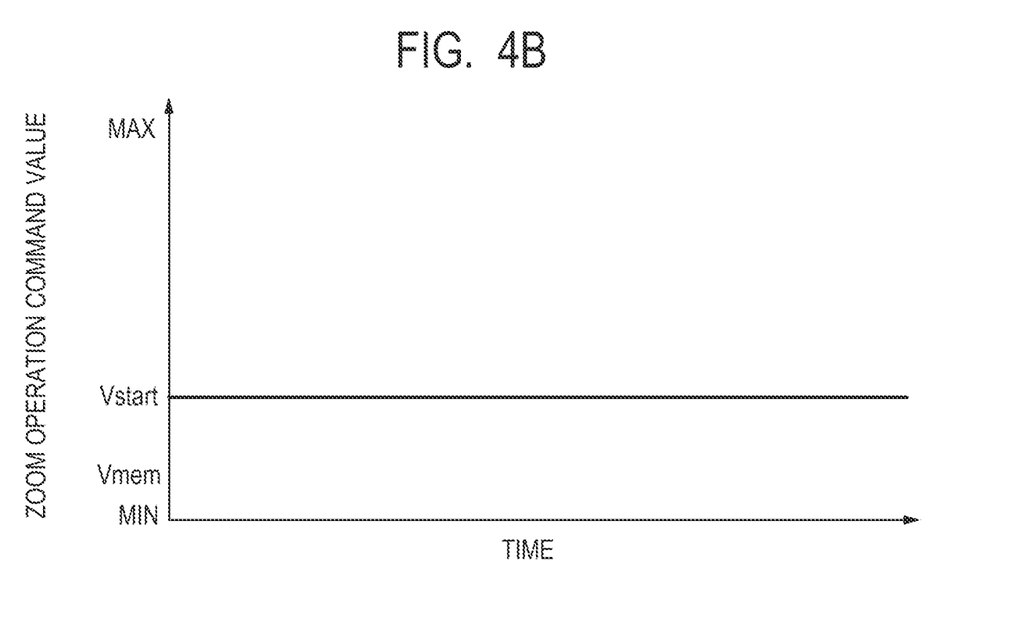
FIG. 4B is a graph of movement of the zoom operation command value (in a case where there is no need to detect a minimum start speed) during the speed reproduction in the first embodiment.

FIG. 4A and FIG. 4B are graphs for showing movements of results of calculating the zoom operation command value by the speed reproducing device 105 during the speed reproduction in the first embodiment.

In FIG. 4A, there is shown an example of the case in which it is determined that there is a need to detect a minimum start speed in Step S102 of FIG. 2.

In this case, as illustrated in the flow chart of FIG. 3, after the zoom operation command value is set as a stored speed (Vmem) stored in the speed storage 104, update of the position information of the zoom lens 204 is monitored (Step S201). Here, when it is determined that the position of the zoom lens 204 has not changed, the predetermined speed is continuously added (Step S202 and Step S203). Then, a speed at the time when the position information of the zoom lens 204 has changed is retained as a minimum start speed (Vstart) (Step S204). The zoom operation command value is then set as the retained minimum start speed to execute a speed preset function.

In FIG. 4B, there is shown an example of the case in which it is determined that there is no need to detect a minimum start speed in Step S102 of FIG. 2. It should be noted, however, that in the example of FIG. 4B, the minimum start speed has been detected and retained in advance as a precondition. Further, a case in which the minimum start speed is set as the same value as the value retained in FIG. 4A is given as an example.

In this case, as illustrated in the flow chart of FIG. 2, with the minimum start speed being larger as a result of comparing the stored speed, which is stored in the speed storage 104, and the minimum start speed with each other, the zoom operation command value is set as the minimum start speed from the start (Step S105 to Step S107).

FIG. 4A and FIG. 4B are merely examples, and the movement of the zoom operation command value is not limited thereto.

Through monitoring of the movement of the lens during the execution of the speed preset function as described above, even when the lens has failed to move, the zoom operation command value can be varied automatically to the minimum speed at which the lens can start moving. As a result, the lens can be prevented from stopping moving by the speed preset at a low speed without complicating operation by an operator.

Second Embodiment

A second embodiment of the present invention is described with reference to FIG. 5 to FIG. 9B.

Now, parts equivalent to those in the first embodiment are denoted by the same reference symbols, and a description thereof is omitted.

In the first embodiment, only the minimum start speed required for the lens to start moving has been detected. However, a lens generally requires the largest power to start moving, and can continue being driven at a constant speed even at a lower speed when the lens once starts moving.

Therefore, in the second embodiment of the present invention, through measurement of a minimum speed (hereinafter referred to as a "minimum stable speed") at which the lens can continue moving stably after the lens starts moving in addition to the minimum start speed, speed preset can be used in a wider speed range.

Figure 5:
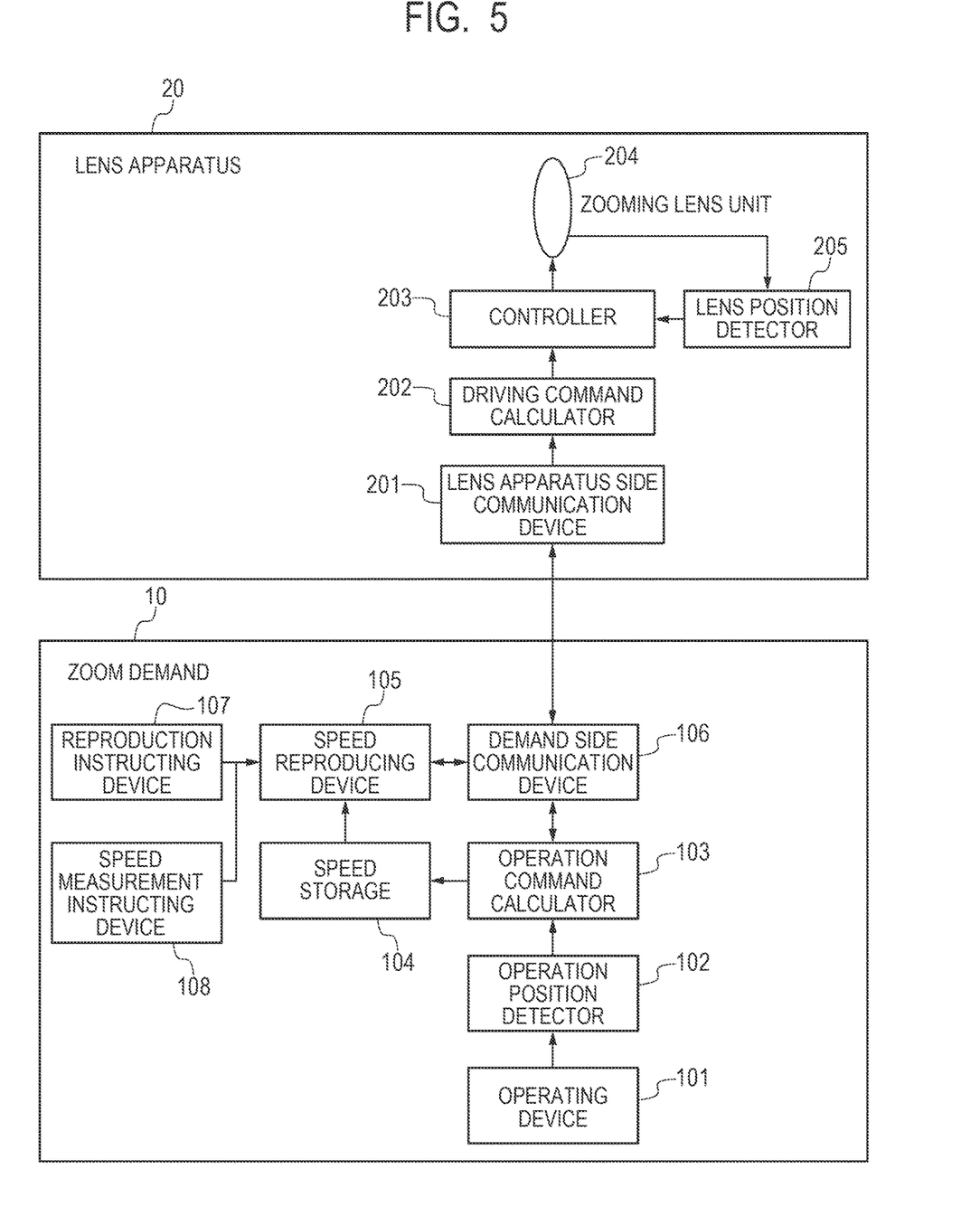
FIG. 5 is a block diagram of a lens apparatus and an operation apparatus according to a second embodiment of the present invention.

FIG. 5 is a block diagram of a lens apparatus and an operation apparatus in the second embodiment.

An operating device 101 to a speed storage 104 and a demand side communication device 106 of the zoom demand 10 are the same as those in the first embodiment.

A speed measurement instructing device (user interface device) 108 is a switch, for example, and is an operation member to be used to issue an instruction to execute detection for a speed of the speed preset. Instead of newly providing a particular operation member, the same operation member as the operation member to be used for the speed reproducing operation and the storage operation in the first embodiment may be used, and meaning of an operation instruction may be switched depending on an operation method and a state of the operation member.

The speed reproducing device 105 is configured to detect a minimum start speed and a minimum stable speed of the present lens in response to a speed detection instruction from the speed measurement instructing device 108. The speed reproducing device 105 is further configured to calculate a zoom operation command value with the use of the zoom operation command value, the minimum start speed, and the minimum stable speed stored in the speed storage 104 in response to the predetermined reproducing operation.

The example in which only the speed detection is performed in response to the speed detection instruction has been described here, but the speed reproduction may be executed directly after the speed detection as in the first embodiment. With this configuration, the operator can immediately confirm a movement in a case where the speed reproduction is executed based on the detection result. Further, without providing the special operation member for the speed detection, the speed detection may be performed only under predetermined conditions as in the first embodiment.

Figure 6:
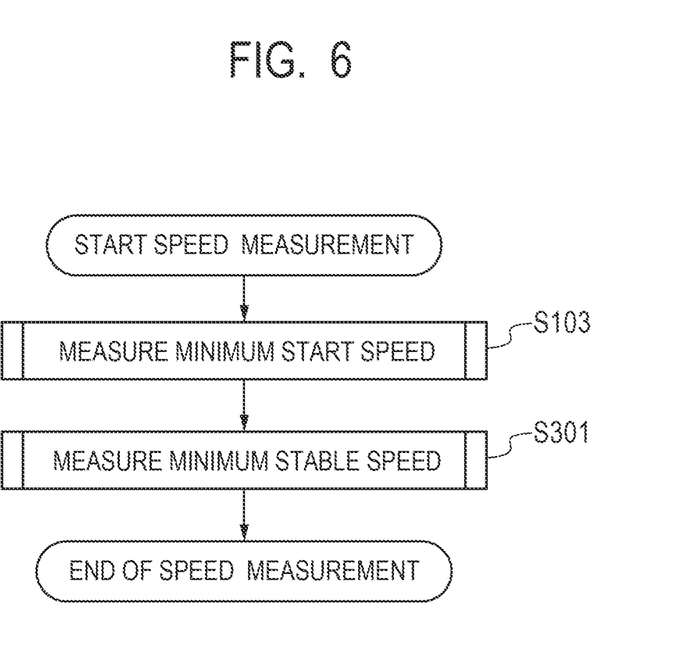
FIG. 6 is a flow chart of speed detection processing in the second embodiment.

FIG. 6 is a flow chart of speed detection processing to be performed by the speed reproducing device 105 when a speed detection instruction is issued by the speed measurement instructing device 108.

In Step S103, the same processing as the processing described in the first embodiment is performed, and the processing proceeds to Step S301. It should be noted, however, that in Step S201 illustrated in FIG. 3, an initial value set for a zoom operation command value may be the minimum value that can be taken by the zoom operation command value instead of the stored speed stored in the speed storage 104.

In Step S301, the minimum stable speed is detected, and the speed detection processing is ended.

Figure 7:
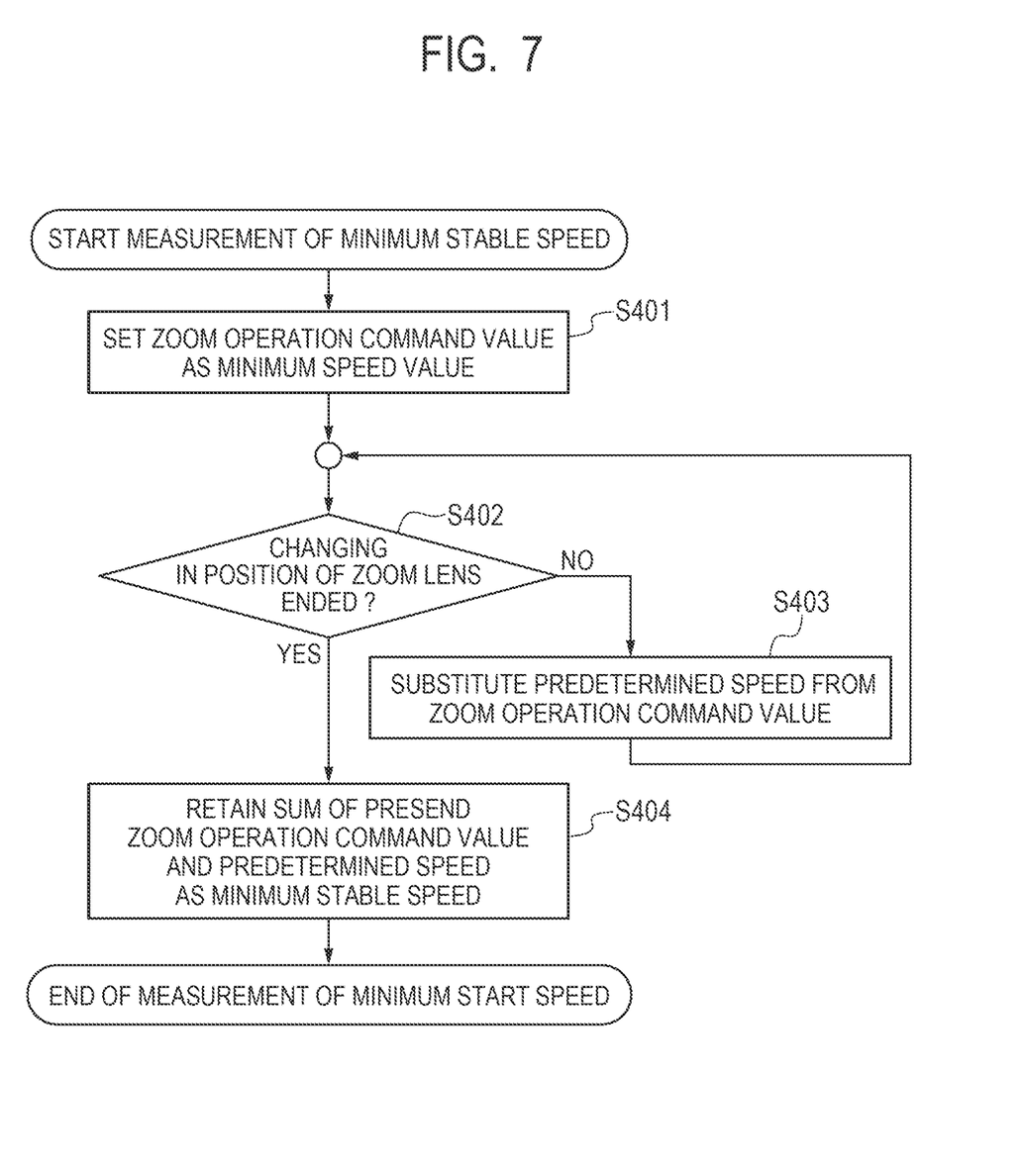
FIG. 7 is a flow chart of processing of detecting a minimum stable speed in the second embodiment.

FIG. 7 is a flow chart for illustrating details of the processing of detecting a minimum stable speed, which is performed by the speed reproducing device 105 in Step S301 of FIG. 6.

In Step S401, the zoom operation command value is set as the minimum start speed detected in Step S103, and the processing proceeds to Step S402.

In Step S402, it is determined whether the position of the zoom lens 204, which has been received by the demand side communication device 106, has changed (the zoom lens 204 has started moving). When the position has changed, the processing proceeds to Step S403, and when the position has not changed, the processing proceeds to Step S404. The determination may be performed at all times, or may be performed every predetermined period of time. Further, time until the determination may be varied depending on the present zoom operation command value.

In Step S403, a predetermined speed may be subtracted from the zoom operation command value to decrease the zoom operation command value, and the processing proceeds to Step S402. The speed to be subtracted at this time may be a constant value, or may be varied depending on a speed indicated by the zoom operation command value.

In Step S404, a sum obtained by adding the speed subtracted last time in Step S403 to a speed of a value at which the position of the zoom lens 204 stops changing is retained as the minimum stable speed, and the detection processing of the minimum stable speed is ended. This addition processing is processing for retaining a speed at which the position of the zoom lens 204 has continued changing stably last time as the minimum stable speed. Further, the minimum stable speed to be retained here may be the only value irrespective of conditions, may be retained for each connected lens, or may be retained for each driving direction.

Figure 8:
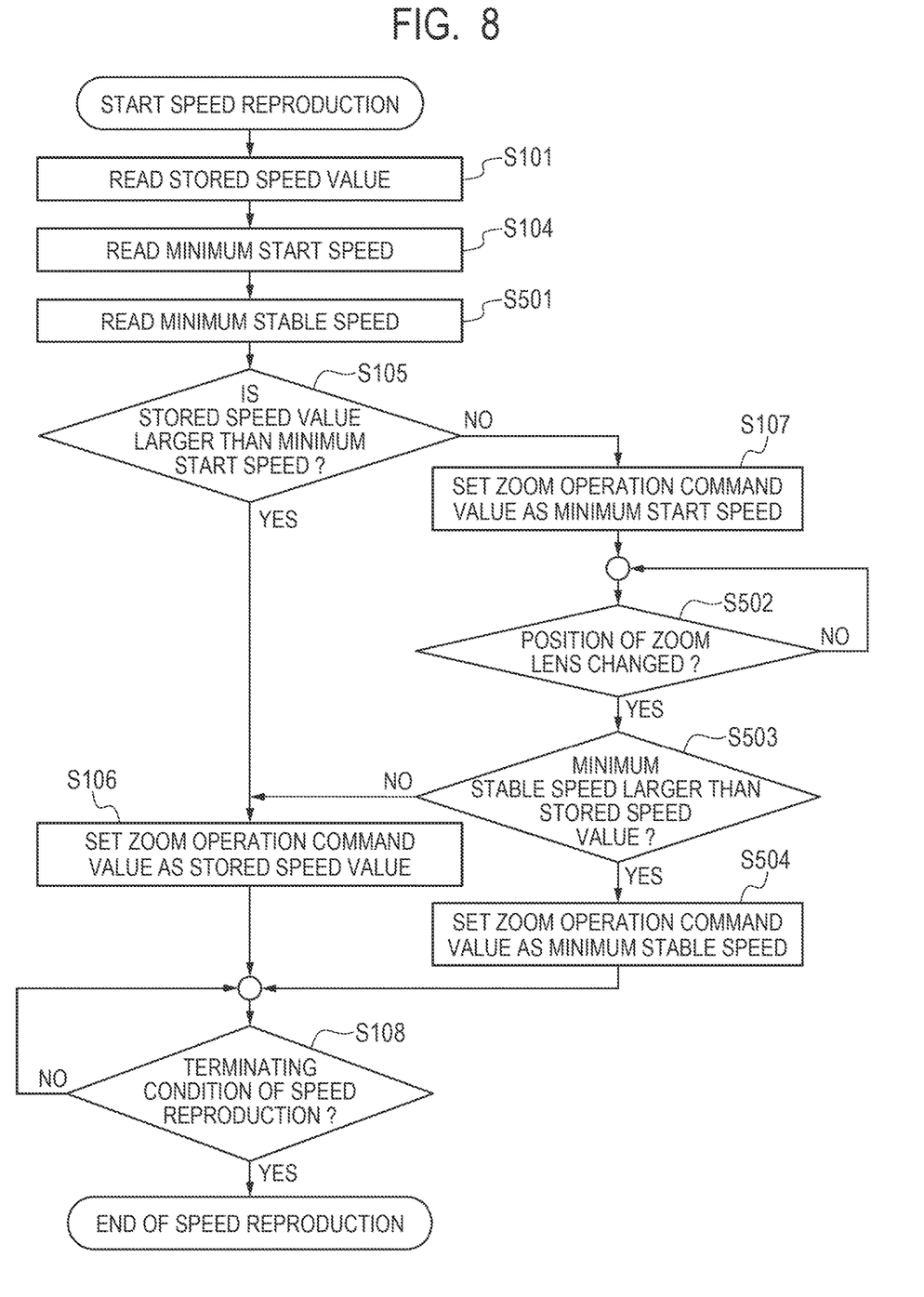
FIG. 8 is a flow chart of speed reproduction processing in the second embodiment.

FIG. 8 is a flow chart of speed reproduction to be performed by the speed reproducing device 105 in the second embodiment.

In Step S101 and Step S104, the same processing as that described in the first embodiment is performed, and the processing proceeds to Step S501.

In Step S501, the minimum stable speed detected in Step S301 of FIG. 6 is read, and the processing proceeds to Step S105.

In Step S105 and Step S106, the same processing as that described in the first embodiment is performed.

In Step S107, the same processing as that described in the first embodiment is performed, and then the processing proceeds to Step S502.

In Step S502, it is determined whether the position of the zoom lens 204, which is received by the demand side communication device 106, has changed (the zoom lens 204 has started moving). Step S502 is repeated when the position has not changed, and the processing proceeds to Step S503 when the position has changed.

In Step S503, the stored speed value read in Step S101 and the minimum stable speed read in Step S501 are compared with each other. As a result of the comparison, when the minimum stable speed is larger than the stored speed value, the processing proceeds to Step S504, and when the minimum stable speed is equal to or smaller than the stored speed value, the processing proceeds to Step S106.

In Step S504, the zoom operation command value is set as the minimum stable speed read in Step S501, and the processing proceeds to Step S108. The zoom driving command value set at this time may be changed immediately from the minimum start speed to the minimum stable speed, or may be gradually changed so that the change in speed is hardly seen. This is true also in Step S106.

In Step S108, the same processing as that described in the first embodiment is performed, and the speed reproduction processing is ended.

Figure 9A:
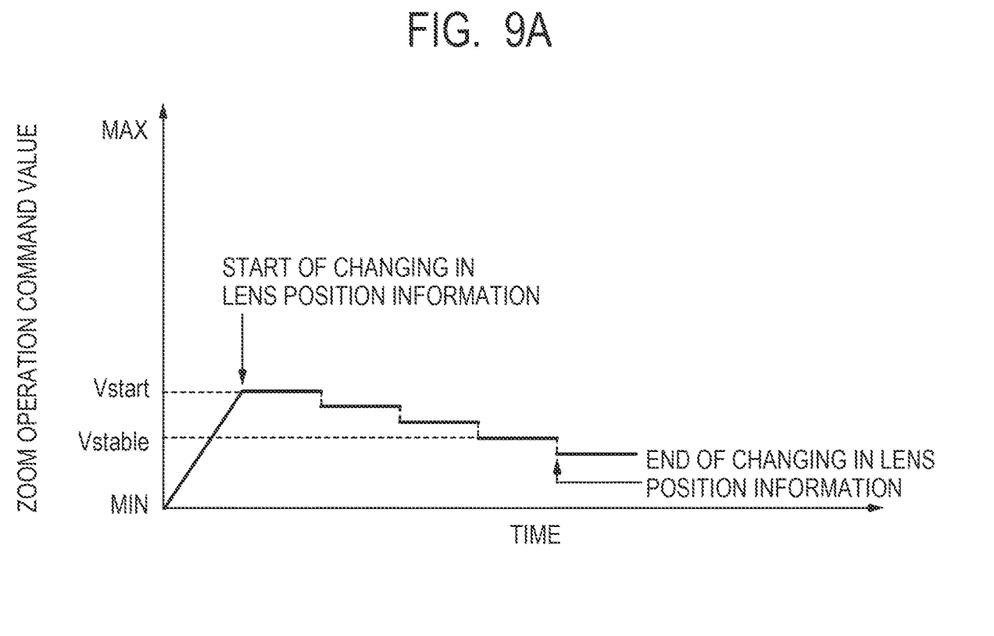
FIG. 9A is a graph of movement of a zoom operation command value during speed detection in the second embodiment.
Figure 9B:
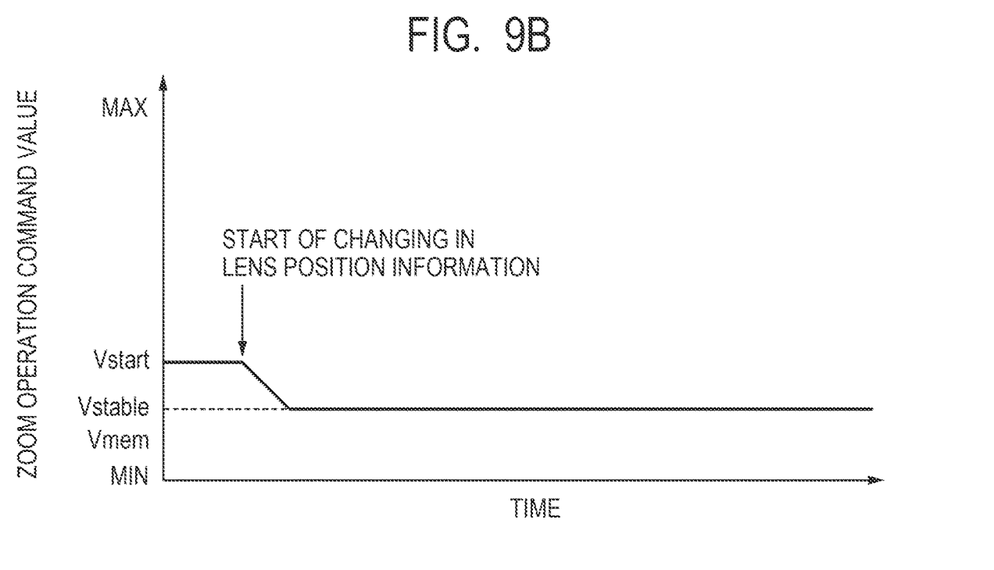
FIG. 9B is a graph of movement of the zoom operation command value during speed reproduction in the second embodiment.

FIG. 9A and FIG. 9B are graphs for showing movements of results of calculating the zoom operation command value by the speed reproducing device 105 during the speed detection and during the speed reproduction in the second embodiment.

In FIG. 9A, there is shown an example of the movement of the zoom operation command value during the speed detection.

Processing of detecting a minimum start speed (Vstart) is the same as the processing in the first embodiment except for the initial value set for the zoom operation command value. In the second embodiment, in order to detect a minimum start speed of the present lens irrespective of the stored speed (Vmem) stored in the speed storage 104, the initial value of the zoom operation command value may be set as a minimum speed that can be taken by the zoom operation command value as shown in FIG. 9A.

When the position of the lens starts changing, as illustrated in the flow chart of FIG. 7, after the zoom operation command value is set as the minimum start speed, the update of the position information of the zoom lens 204 is monitored (Step S401). Here, when it is determined that the position information of the zoom lens 204 has continued changing, a predetermined speed is reduced (Step S402 and Step S403). In this example, the speed reduction method and the method of checking for the update of the position information are different from when the minimum start speed is detected, but the same methods may be used. Then, a speed immediately before the change in position of the zoom lens 204 is stopped is retained as a minimum stable speed (Vstable) (Step S404).

In FIG. 9B, there is shown an example of the movement of the zoom operation command value during the speed reproduction. It should be noted, however, that in the example of FIG. 9B, the minimum start speed and the minimum stable speed have been detected and retained in advance as a precondition. Further, a case in which the minimum start speed and the minimum stable speed are the same values as those retained in FIG. 9A is given as an example.

In this case, as illustrated in the flow chart of FIG. 8, with the minimum start speed being larger as a result of comparing the stored speed, which is stored in the speed storage 104, and the minimum start speed with each other, the zoom operation command value is set as the minimum start speed from the start (Step S105 and Step S107). Then, after the position of the zoom lens 204 has changed, the stored speed value and the minimum stable speed are compared with each other, and with the minimum stable speed being larger, the zoom operation command value is changed to the minimum stable speed (Step S503 and Step S504). At this time, the zoom operation command value may be changed gradually as shown in FIG. 9B.

FIG. 9A and FIG. 9B are merely examples, and the movement of the zoom operation command value is not limited thereto.

As described above, in the second embodiment, through the provision of the speed detection instruction, in addition to the minimum start speed required for the lens to start moving, the minimum stable speed required for the lens to be stably moved at a constant speed after the lens has started moving can be detected. As a result, while preventing the lens from stopping moving by the speed preset at a low speed, the speed preset at as low a speed as possible can be used.

In the exemplified embodiments, the zoom lens of the lens apparatus has been given as an example of a movable optical member to be operated by the zoom demand. However, the present invention is not limited thereto, and even when the present invention is applied with the use of a focus lens, a macro lens, or a stop as the movable optical member to be operated by the zoom demand, the effects of the present invention can be obtained.

Further, when an image pickup apparatus is formed of the operation apparatus according to at least one embodiment of the present invention, the lens apparatus operated by the operation apparatus, and an image pickup element arranged at an image plane of the lens apparatus, an image pickup apparatus with the effects of the present invention can be implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-222461, filed Nov. 28, 2018, which is hereby incorporated by reference herein in its entirety.

What is claimed is:

1. An operation apparatus for operating driving of an optical member, the operation apparatus comprising:
   a storage configured to store a driving speed of the optical member;
   an operation member; and
   a processor configured to generate a command corresponding to the stored driving speed based on an operation of the operation member,
   wherein the processor is configured to determine whether a driving speed of the optical member of which driving is operated based on the generated command is a predetermined driving speed different from the stored driving speed, and change the generated command to another command in a case where the driving speed of the optical member of which driving is operated based on the generated command is the predetermined driving speed, so that a driving speed of the optical member becomes a driving speed of the optical member corresponding to the another command.

2. The operation apparatus according to claim 1, wherein the processor is configured to change the generated command to the another command based on a position of the optical member.

3. The operation apparatus according to claim 1, wherein the processor is configured to change the generated command to the another command in a case where the position of the optical member is unchanged based on the generated command.

4. The operation apparatus according to claim 1, wherein the processor is configured to change the generated command to, as the another command, a predetermined command.

5. The operation apparatus according to claim 4, wherein the processor is configured to obtain the predetermined command by changing the generated command until a state of the optical member is changed from a state where the optical member is stopping to a state where the optical member is moving.

6. The operation apparatus according to claim 4, wherein the processor is configured to perform change the generated command to the predetermined command in a case where the stored driving speed is lower than a driving speed corresponding to the predetermined command.

7. The operation apparatus according to claim 4, wherein the processor is configured to obtain the predetermined command by changing the generated command until a state of the optical member is changed from a state where the optical member is moving to a state where the optical member is stopping.

8. The operation apparatus according to claim 7, further comprising a user interface device for an instruction of obtaining the predetermined command.

9. The operation apparatus according to claim 4, wherein the processor is configured to store the predetermined command with respect to each direction in which the optical member is to be driven.

10. The operation apparatus according to claim 4, wherein the processor is configured to obtain the predetermined command from a lens apparatus including the optical member.

11. The operation apparatus according to claim 4, wherein the processor is configured to generate the predetermined command based on information of at least one of identification information, a posture, a temperature, a driving characteristic, or a control characteristic of a lens apparatus including the optical member.

12. A lens apparatus comprising:
   an optical member; and
   an operation apparatus for operating driving of the optical member, the operation apparatus comprising:
   a storage configured to store a driving speed of the optical member;
   an operation member; and
   a processor configured to generate a command corresponding to the stored driving speed based on an operation of the operation member,
   wherein the processor is configured to determine whether a driving speed of the optical member of which driving is operated based on the generated command is a predetermined driving speed different from the stored driving speed, and change the generated command to another command based on a state in a case where the driving speed of the optical member of which driving is operated based on the generated command is the predetermined driving speed, so that a driving speed of the optical member becomes a driving speed of the optical member corresponding to the another command.

13. An image pickup apparatus comprising:
a lens apparatus comprising:
  an optical member; and
  an operation apparatus for operating driving of the optical member, the operation apparatus comprising:
    a storage configured to store a driving speed of the optical member;
    an operation member; and
    a processor configured to generate a command corresponding to the stored driving speed based on an operation of the operation member,
    wherein the processor is configured to determine whether a driving speed of the optical member of which driving is operated based on the generated command is a predetermined driving speed different from the stored driving speed, and change the generated command to another command in a case where the driving speed of the optical member of which driving is operated based on the generated command is the predetermined driving speed, so that a driving speed of the optical member becomes a driving speed of the optical member corresponding to the another command; and
an image pickup element configured to receive an image formed by the lens apparatus.

* * * * *